US010038652B2

(12) United States Patent
Ghanwani et al.

(10) Patent No.: US 10,038,652 B2
(45) Date of Patent: Jul. 31, 2018

(54) SELF TUNING BUFFER ALLOCATION IN A SHARED-MEMORY SWITCH

(71) Applicant: Dell Products L.P., Round Rock, TX (US)

(72) Inventors: Anoop Ghanwani, Roseville, CA (US); Shivakumar Sundaram, Chennai (IN); Aravind Babu Mahendrababu, Chennai (IN); Avinash Natarajan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 15/251,935

(22) Filed: Aug. 30, 2016

(65) Prior Publication Data

US 2018/0063038 A1  Mar. 1, 2018

(51) Int. Cl.
H04L 12/861 (2013.01)
H04L 12/933 (2013.01)

(52) U.S. Cl.
CPC ........ H04L 49/9047 (2013.01); H04L 49/103 (2013.01)

(58) Field of Classification Search
CPC .......................... H04L 49/9047; H04L 49/103
See application file for complete search history.

(56) References Cited

U.S. PATENT DOCUMENTS

2013/0250757 A1* 9/2013 Tabatabaee ........... H04L 47/266 370/230
2016/0344636 A1* 11/2016 Elias ................... H04L 47/2441
2017/0201469 A1* 7/2017 Elias ................... H04L 43/0817

* cited by examiner

Primary Examiner — Feben M Haile
(74) Attorney, Agent, or Firm — Jackson Walker L.L.P.

(57) ABSTRACT

An N-port, shared-memory switch allocates a shared headroom buffer pool (Ps) for a priority group (PG). Ps is smaller than a worst case headroom buffer pool (Pw), where Pw equals the sum of worst case headrooms corresponding to each port-priority tuple (PPT) associated with the PG. Each worst case headroom comprises headroom required to buffer worst case, post-pause, traffic received on that PPT. Subject to a PPT maximum, each PPT may consume Ps as needed. Because rarely will all PPTs simultaneously experience worst case traffic, Ps may be significantly smaller than Pw, e.g., Ps<(Pw/A) where M>=2. Ps may be size-adjusted based on utilization of Ps, without halting traffic to or from the switch. If Ps utilization exceeds an upper utilization threshold, Ps may be increased, subject to a maximum threshold (Pmax). Conversely, if utilization falls below a lower utilization threshold, Ps may be decreased.

20 Claims, 3 Drawing Sheets

SELF TUNING BUFFER ALLOCATION IN A SHARED-MEMORY SWITCH

TECHNICAL FIELD

The present disclosure generally relates to information handling system networks and, more particularly, shared-memory switches employed in information handling system networks.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

An information handling system can be configured in several different configurations ranging from a single, stand-alone computer system to a distributed, multi-device computer system, to a networked computer system with remote or cloud storage systems.

Two or more information handling systems may communicate with one another via an Ethernet, or another suitable Internet protocol (IP) network, in compliance with a priority flow control (PFC) protocol. Such a network may be implemented with physical transmission media interconnected by a plurality of network devices including packet switching devices. A packet switching device may be implemented as a shared-memory switch.

A shared-memory switch may include a plurality of ports, each capable of sustaining high speed serial communication with one or more neighboring network devices or peers. Each port may be able to support multiple queues. Packets communicated to and from a shared-memory switch may be associated with traffic flows, each of which may be associated with a level of priority indicated by one or more bits in a packet header. To maintain generality, the shared-memory switch may be configured to accommodate all supported traffic flows, i.e., all supported levels of priority, across all ports.

PFC networks support a PAUSE command or frame that instructs the recipient of the PAUSE command to suspend transmission of packets to the sender of the PAUSE command. To accommodate post-PAUSE transactions, i.e., packets transmitted by the recipient of the PAUSE command during an interval that includes the time required for the PAUSE command to traverse the link or set of links between the neighboring devices, and the time required for the recipient to actually act on that command, the shared-memory switch allocates special purpose buffers, referred to as headroom buffers.

To maintain adequate performance, buffers, whether used for regular burst absorption or headroom, may be implemented in semiconductor random access memory (RAM). The comparatively high cost of RAM, however, generally imposes a constraint on the maximum amount of RAM that may be included within any shared-memory switch. Accordingly, the importance of using the available RAM in a shared-memory switch efficiently is very high and ever increasing, as the design of shared-memory switches continues to push the performance envelop.

SUMMARY

In accordance with disclosed subject matter, issues associated with allocating scarce and precious memory for buffers employed by a shared-memory network switch, sometimes referred to herein as a shared-memory switch, a network switch, or simply as a switch, suitable for use in data center bridging network or another type of PFC-enabled network are addressed.

Historically, shared-memory switches employed in PFC-enabled networks, have statically allocated a headroom buffer pool to each port-priority tuple (PPT) that belongs to a priority group, i.e., a group of one or more levels of priority that share buffer space or are otherwise defined as a group by the shared-memory switch, based on a calculation or estimation of the worst case headroom required. As used herein, "worst case headroom" and "worst case headroom buffer", refer to the headroom required to buffer all traffic received by a PPT of a shared-memory switch that issued a PAUSE command from the port of the peer device that received the PAUSE command under a worst case traffic pattern, i.e., a traffic pattern resulting in the greatest amount of post-PAUSE packets transmitted by the port of the peer device. Annex O of IEEE 802.1Qbb provides a well-known formula for estimating worst case headroom, Hw, for a particular peer-to-peer connection.

Accordingly, conventionally implemented shared-memory switches employed in PFC networks may statically allocate a worst case headroom buffer pool (Pw) to each priority group where Pw equals or approximates the sum of Hw values for each PPT in the applicable priority group. For the sake of clarity, the shared-memory switches referred to herein, unless expressly indicated otherwise, support traffic flows for all priorities in all priority groups. Nevertheless, it should be readily apparent to those of ordinary skill in field of data center bridging networks that headroom buffer allocation methods and systems disclosed herein encompass shared-memory switch configurations in which one or more ports may support less than all of the priorities in a priority group.

In accordance with a disclosed switching method, a shared-memory switch that supports a PFC protocol, comprising a plurality of ports, allocates a headroom buffer pool to each of one or more priority groups. Each such headroom buffer pool is shared among each PPT in a priority group and, accordingly, each such headroom buffer pool is referred to herein as a shared headroom buffer pool (Ps). At least one of the priority groups may be a lossless priority group that encompasses one or more lossless priority levels.

In at least one embodiment, a size of an initial allocation of the shared headroom buffer pool Ps is determined in accordance with one or more worst case headroom values, but Ps is smaller than the worst case headroom buffer pool Pw. An example embodiment may initially determine a worst case headroom for each port-priority tuple (PPT) associated with the priority group. Each such PPT-specific worst case headroom buffer value may referred to herein as an Hwppt value. The embodiment may then determine a worst case headroom buffer pool (Pw) as the sum of all Hwppt values associated with the PPTs that are part of the priority group and allocate a shared headroom buffer pool, Ps, of size Pw/M where M>1.

The switching method may permit each of the plurality of PPTs to consume as much of the shared headroom buffer pool Ps as needed for the applicable priority group, subject to a PPT maximum threshold. For example, with respect to any particular priority group, each PPT may utilize a headroom buffer less than or equal to the applicable PPT maximum, which may be equal to the worst case PPT headroom buffer.

Recognizing that rarely will all PPTs simultaneously experience worst case post-PAUSE traffic, the initial allocation of the shared headroom buffer pool Ps may be significantly smaller than the worst case headroom buffer pool Pw. In at least one such embodiment, the shared-memory switch may allocate a shared headroom buffer pool Ps of size Pw/M where M is greater than or equal to 2. Other embodiments may initially allocate a shared headroom buffer pool Ps of greater or lesser size.

The switching method may further include dynamic adjustment of the shared headroom buffer pool Ps. In at least one embodiment, dynamic shared headroom buffer adjustment includes monitoring the shared headroom buffer pool utilization, i.e., how much of the shared headroom buffer pool Ps is currently allocated to or otherwise utilized by the switch, and adjusting the shared headroom buffer pool in accordance with the utilization. Adjusting the shared headroom buffer pool allocated for any priority group may be achieved without halting traffic to or from the shared-memory network switch, e.g., by modifying one or more configuration registers that indicate Ps and/or another suitable value.

Dynamic adjustment of the shared headroom buffer pool may include increasing the shared headroom buffer pool Ps responsive to detecting the utilization exceeding a high utilization threshold and, conversely, decreasing the shared headroom buffer pool Ps responsive to detecting the utilization less than a low utilization threshold.

Decreasing the shared headroom buffer pool Ps may include determining an un-utilized portion of the shared headroom buffer pool Ps, determining a headroom reduction in accordance with the un-utilized portion and a reduction factor, e.g., the reduction equals the product of the un-utilized portion and the reduction factor, and releasing a portion of the shared headroom buffer pool Ps in accordance with the headroom reduction. Reductions of Ps may be subject to a shared headroom buffer pool minimum threshold (Pmin), e.g., N maximum transmission units (MTUs) where N equals the number of PPTs associated with the priority group.

Increasing the shared headroom buffer pool Ps may include determining a headroom increase in accordance with the size of the shared headroom buffer pool Ps and an increase factor, e.g., headroom increase equals the product of Ps and the increase factor, and increasing the shared headroom buffer pool Ps by the headroom increase, subject to the shared headroom buffer pool maximum threshold Pmax. In an example embodiment, the low utilization threshold equals 0.8, the reduction factor is 0.5, the high utilization threshold is 0.9, and the increase factor is 1.1. Other embodiments may use one or more values that differ from one or more of the example embodiment.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following FIGUREs and detailed written description.

BRIEF DESCRIPTION OF THE DRAWINGS

The description of the illustrative embodiments can be read in conjunction with the accompanying FIGUREs. It will be appreciated that, for simplicity and clarity of illustration, elements illustrated in the FIGUREs have not necessarily been drawn to scale. For example, the dimensions of some of the elements may be exaggerated relative to other elements. Embodiments incorporating teachings of the present disclosure are shown and described with respect to the FIGUREs presented herein, in which.

DETAILED DESCRIPTION

Figure 1:
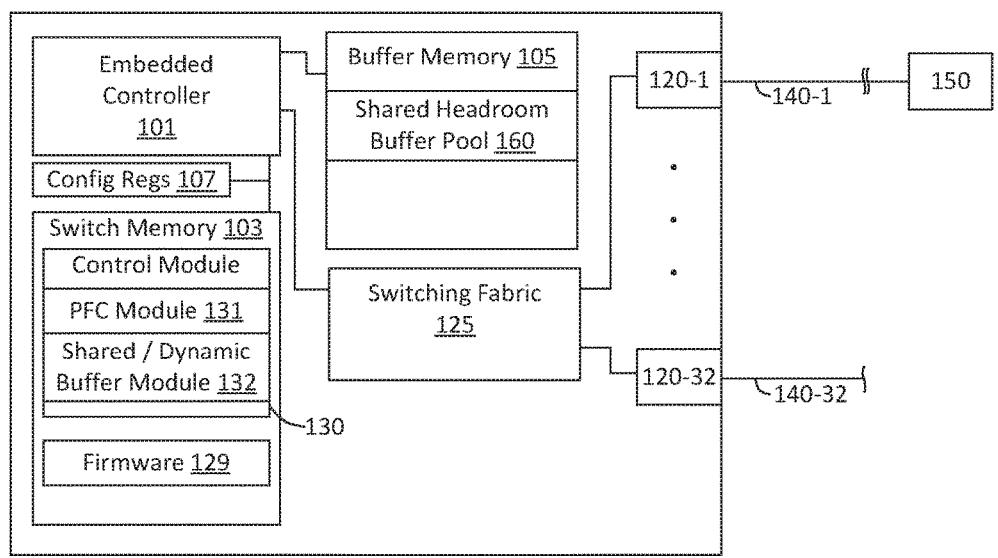
FIG. 1 illustrates a block diagram of an information handling system suitable for use as a shared-memory switch.

In the following detailed description, specific exemplary embodiments in which disclosed subject matter may be practiced are described in sufficient detail to enable those skilled in the art to practice the disclosed embodiments. For example, details such as specific method orders, structures, elements, and connections have been presented herein. However, it is to be understood that the specific details presented need not be utilized to practice embodiments of disclosed subject matter. It is also to be understood that other embodiments may be utilized and that logical, architectural, programmatic, mechanical, electrical and other changes may be made within the scope of the disclosed subject matter. The following detailed description is, therefore, not to be taken as limiting the scope of the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features may be described which may be exhibited by some embodiments and not by others. Similarly, various requirements may be described which may be requirements for some embodiments but not for other embodiments.

It is understood that the use of specific component, device, and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that term is utilized.

Disclosed subject matter encompasses a multi-port, shared-memory network switch, referred to herein simply as a shared-memory switch, that supports a PFC protocol and employs one or more shared headroom buffer pools, wherein each shared headroom buffer pool is shared among the shared-memory switch's ports. In at least one embodiment, a shared headroom buffer pool is allocated for each priority group and where each PPT may consume or otherwise utilize the shared headroom buffer pool as needed for the applicable traffic, subject, in at least some embodiments, to a minimum headroom buffer threshold, a maximum headroom buffer threshold, or both.

Rather than statically allocating a worst case headroom buffer Hw to each PPT associated with a priority group, the shared-memory switch may initially allocate a significantly smaller shared headroom buffer pool to each priority group, while permitting each PPT, subject to a PPT maximum, to consume the shared headroom buffer pool as needed for traffic of the applicable priority group, where the port maximum equals the sum of or otherwise reflects the worst case PPT headrooms associated with the applicable PPT and priority group.

In addition, the shared-memory switch may be configured to dynamically adjust the size of the shared headroom buffer pool based on the collective utilization of the shared headroom buffer pool. In at least one such embodiment, a dynamic headroom allocation method initially allocates, for each of one or more priority groups, any one or more of which may be a lossless priority group, a shared headroom buffer pool that is substantially smaller than the worst case headroom buffer pool Pw. Utilization of the allocated shared headroom buffer pool is monitored. If the allocated shared headroom buffer pool is heavily underutilized, a portion of the shared headroom buffer pool may be reclaimed and tasked for other buffer purposes, whether for non-headroom buffers for the same priority group or allocated to a different priority group. Conversely, if utilization of the shared headroom buffer pool exceeds a high utilization threshold, the existing allocation may be increased. This may be done by reducing the non-headroom buffers or by allocation of additional buffers to the priority group in question.

Referring now to the drawings, FIG. 1 illustrates a shared-memory switch 100 for implementing one or more self-tuning and shared headroom buffer pools. The shared-memory switch 100 illustrated in FIG. 1 includes an embedded controller 101, general purpose storage or memory referred to herein as switch memory 103, a buffer memory 105, and a plurality of ports 120-1 through 120-32, each of which is coupled to a switching fabric 125 coupled to embedded controller 101. Although switch memory 103 and buffer memory 105 are depicted in FIG. 1 as distinct structures or elements, they may comprise portions of a common memory device or a common group of memory devices. In other embodiments, buffer memory 105 may be implemented in one or more memory devices distinct from switch memory 103. Switch memory 103 may encompass at least some flash memory including, as an example, flash memory to store firmware 129 for shared-memory switch 100.

Shared-memory switch 100 may include a control module 130, comprising instructions executable by embedded controller 101, to control the ingress of incoming traffic and the egress of outgoing traffic via switching fabric 125.

The control module 130 illustrated in FIG. 1 includes a PFC module 131 that enables switch 100 to operate in compliance with a PFC protocol, an example of which is defined by the IEEE 802.1Qbb standard. In a PFC protocol, traffic flow may proceed until a buffer associated a particular priority group and a particular port 120 equals or exceeds a maximum headroom buffer threshold, at which point switch 100 may issue a PAUSE command, via the applicable port 120, requesting its peer to stop, at least temporarily for a time specified in the PAUSE command, transmitting new packets associated with the particular priority group to the applicable port 120.

Because a PAUSE command, once issued by shared-memory switch 100, must traverse any sources of delay internal to shared-memory switch 100 and a network link 140 connecting a port 120 of switch 100 to a remote peer device 150, remote peer device 150 may continue to issue packet traffic before the PAUSE arrives. Once the PAUSE command traverses the transmission path and arrives at remote peer device 150, remote peer device 150 must still process the PAUSE command before it can halt packet traffic to shared-memory switch 100. During this interval, remote peer device 150 may continue to send traffic to shared-memory switch 100 and this traffic must be buffered to maintain or achieve lossless performance. In at least one embodiment, shared-memory switch 100 includes a shared/dynamic buffer module 132 that creates and dynamically maintains a shared headroom buffer pool 160. Although FIG. 1 illustrates a single shared headroom buffer pool 160, shared-memory switch 160 may maintain multiple shared headroom buffer pools including, in some embodiments, a shared headroom buffer pool 160 for each priority group.

Figure 2:
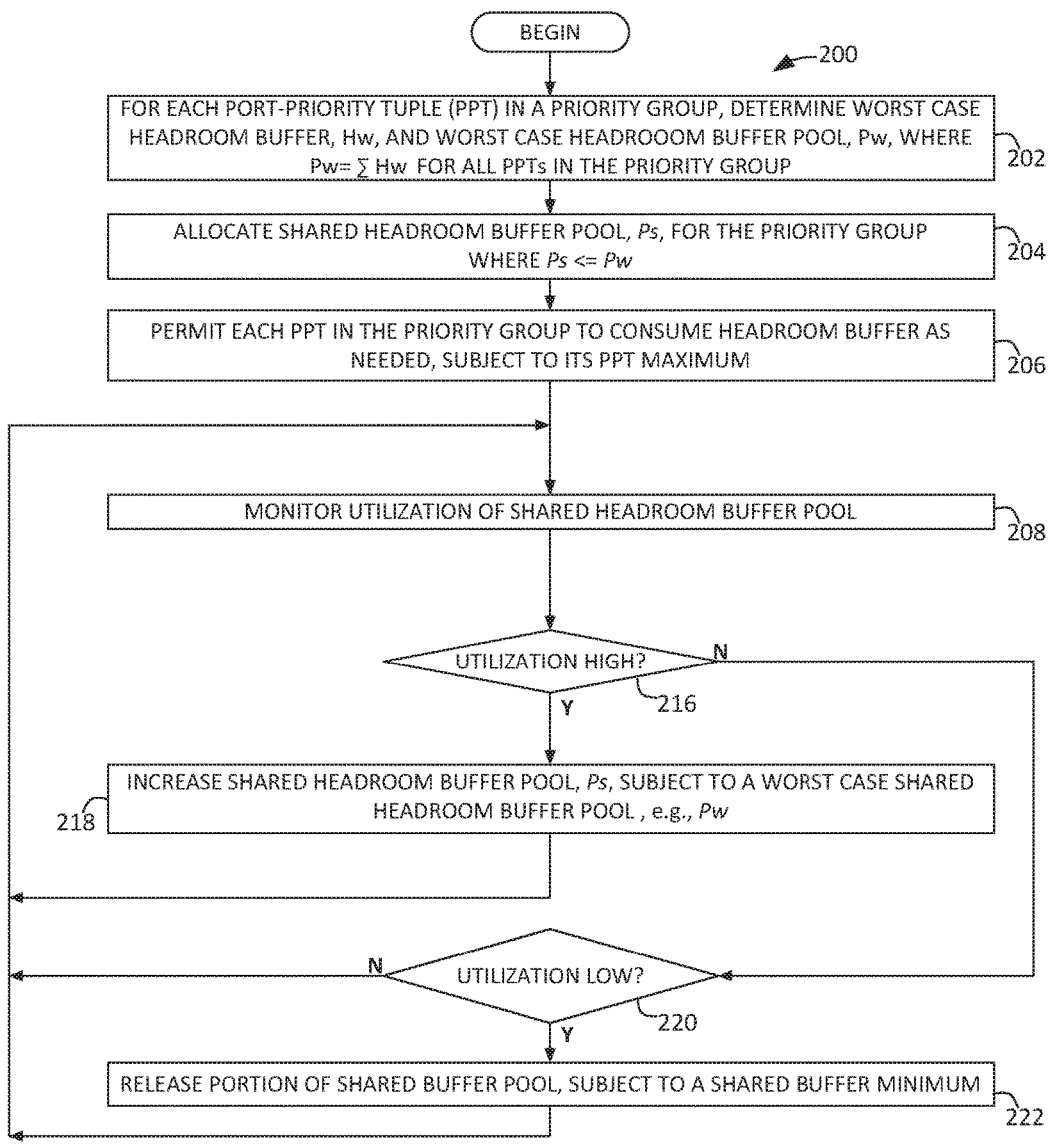
FIG. 2 illustrates a flow block diagram of a buffer allocation method.

FIG. 2 illustrates a flow diagram of a process 200 performed by shared-memory switch 100 and embedded controller 101 upon executing instructions corresponding to shared/dynamic buffer module 132 of FIG. 1 to create and maintain the shared headroom buffer pool 160 illustrated in FIG. 1. For the sake of clarity, the process 200 illustrated in FIG. 2 represents the process performed for the shared headroom buffer pool corresponding to one priority group. Analogous process steps may be performed for each priority group associated with shared-memory switch 100.

The process 200 illustrated in FIG. 2 begins by determining (block 202) Hwppt values for each port-priority tuple of the applicable priority group. Each Hwppt value may be determined based on various factors including, as non-limiting examples, link speed, physical medium type, cable length, and delay components from higher levels. Each PPT may have its own unique value of Hwppt and, in at least one embodiment, one or more of the Hwppt values may be calculated in accordance with Appendix O of IEEE 802.3Qbb, hereinafter referred to simply as Appendix O. Other embodiments may modify the Hwppt calculated under Appendix O or calculate Hwppt using a different algorithm.

The block 202 illustrated in FIG. 2 also includes determining a size or value for worst case headroom buffer pool, Pw, which may be equal to the sum of all of the worst case PPT headroom buffers associated with the priority group.

Again, as indicated previously, the embodiments of shared-memory switch 100 support each priority-group across all of the switch's ports. In other embodiments, the number of ports that support a particular priority group may vary from one priority group to another.

Embodiments of shared-memory switch 100 may include configuration registers 107 (see FIG. 1) including one or more headroom buffer allocation configuration registers (not depicted explicitly). In these embodiments, any of the various headroom buffer allocation parameters referenced thus far may be stored, either manually by an administrator or automatically, in one of the maximum headroom buffer configuration registers 107 to enable and support a shared and dynamically adjustable headroom buffer pool. Embodiments of shared-memory switch 100 may include configuration registers for storing as non-limiting examples: the worst case PPT headroom buffer value, Hwppt, for each PPT in the priority group, the size of the shared headroom buffer pool, Ps, the size of the worst case headroom buffer pool Pw, or any other one or more suitable values. Other embodiments may employ more or fewer maximum headroom buffer configurations registers.

To illustrate an example configuration, shared-memory switch 100 may support a plurality of priority groups across each of 32 ports where each port is capable of sustaining a bit rate of 40 Gb/sec. If employed in a configuration that uses 100 meter cable lengths between neighboring devices and an MTU size of 9216 bytes, the maximum headroom buffer Hw recommended under Appendix O is roughly 60 KB.

In addition, a minimum buffer allocation for ingress port may be 2 MTUs or roughly 18 KB. If shared-memory switch 100 supports 32 ingress ports, the conventional buffer allocation required for a single lossless priority is equal to the worst case headroom buffer pool, Pw, which is roughly 32*60 KB, plus the 32*18 KB required for ingress. Accordingly, roughly 32*78 KB or 2.5 MB may be required to support a single lossless priority group. If a shared-memory switch has, as an example, 4 MB of buffer memory, such a switch could not support more than a single lossless priority group under conventional buffer allocation.

To conserve buffer memory without significantly jeopardizing lossless performance, the process 200 illustrated in FIG. 2 allocates (block 204) a shared headroom buffer pool, Ps, that is smaller than Pw. Moreover, embodiments of shared-memory switch 100 may allocate a shared headroom buffer pool Ps that is significantly smaller than Pw. For example, the shared headroom buffer pool, Ps, allocated by shared-memory switch 100 may be less than or equal to Pw/M where M is greater than or equal to 2. Continuing with the previous example, the reduction in shared headroom buffer achieved by allocating the shared headroom buffer pool Ps in this manner would be at least 0.5*32*60 KB or 0.96 MB.

Although the shared headroom buffer pool Ps initially allocated by shared-memory switch 100 is not large enough to accommodate worst case traffic patterns simultaneously-occurring on each of the switch ports, the process 200 illustrated in FIG. 2 permits (block 206) any port to use as much of the shared headroom buffer pool Ps as it needs, up to a some maximum headroom buffer threshold for the port. The term "port maximum" is used herein to refer to the amount of the shared headroom buffer, Ps, that the port may consume in conjunction with traffic of the applicable PG. For example, if an embodiment supports a first priority group of two priority levels, e.g., L1 and L2, across each of its ports, the port maximum for the first port may equal the sum of the worst case headroom Hwppt for PPT(1,1), i.e., port 1, priority 1 and the worst case headroom Hwppt for PPT(1,2), i.e., port 1, priority 2.

Shared-memory switch 100 may permit each port 120 to consume the shared headroom buffer pool Ps as needed or substantially as needed because rarely will all or substantially all of the ports 120 simultaneously experience worst case packet traffic for any given priority group. In other words, despite using a shared headroom buffer pool, Ps, that may be half the size of the worst case headroom buffer pool, Hw, switch 100 may be able to maintain lossless performance as long as the applicable traffic patterns associated with the ports that are actually paused do not collectively require headroom buffer that is greater than Ps.

As suggested above, the size of the shared headroom buffer pool, Ps, may be determined as a percentage or fraction of the worst case headroom buffer pool, Pw, based on historical data, anecdotal observations, or any other source of information. In at least one embodiment, the size of the shared headroom buffer pool, Ps, is equal to or approximately equal to half the size of the worst case headroom buffer pool, Pw.

The process 200 illustrated in FIG. 2 supports dynamic adjustment of the shared headroom buffer pool Ps. In particular, the process 200 illustrated in FIG. 2 monitors (block 208) utilization or usage of the shared headroom buffer pool Ps. If (block 216) utilization of the shared headroom buffer pool exceeds a high utilization threshold, the switch may increase (block 218) a size of the shared headroom buffer pool, Ps, subject to a worst case or maximum shared headroom buffer pool size, e.g. Pw or some other maximum value.

The amount of the increase in shared headroom buffer pool associated with block 218 may be determined algorithmically based on an increase factor. For example, if the amount of storage currently allocated to the shared headroom buffer pool is X MB, the high utilization threshold is 90%, the current utilization exceeds 90% of the shared headroom buffer pool, and the increase factor is 110%, the process 200 of FIG. 2 may increase the shared headroom buffer pool to 1.1*X MB, assuming that the size of the worst case shared headroom buffer pool, Pw, exceeds 1.1*X MB.

Conversely, if (block 220) utilization of the shared headroom buffer pool is less than a low utilization threshold, the shared-memory switch 100 may release (block 222) a portion of the shared headroom buffer pool Ps, in accordance with a release factor and subject to a shared headroom buffer pool minimum, and make the released resources available for ingress, egress, and/or non-headroom buffers for any priority group supported by the switch, whether lossless or otherwise. In at least one embodiment, the low utilization threshold is 80%, the release factor is 50%, and the algorithm determines the amount of the shared headroom buffer pool to release based on the release factor and the amount of buffering that is currently unused.

For example, if the shared headroom buffer pool Ps is 100 KB and the utilization drops below 80%, i.e., the amount of shared headroom buffer pool Ps that is being utilized drops below 80 KB, the algorithm would release 10 KB from the shared headroom buffer pool, i.e., 50% of the 20 KB of un-utilized shared headroom buffer pool space. The shared headroom buffer pool minimum size incorporated into block 222 may be based on the MTU size or one or more other factors. In at least one embodiment, the minimum shared headroom buffer Pmin may be equal to N×MTU where N is the number of port-priority tuples associated with the applicable priority group. Other embodiments may employ a different shared headroom buffer pool minimum.

Figure 3A:
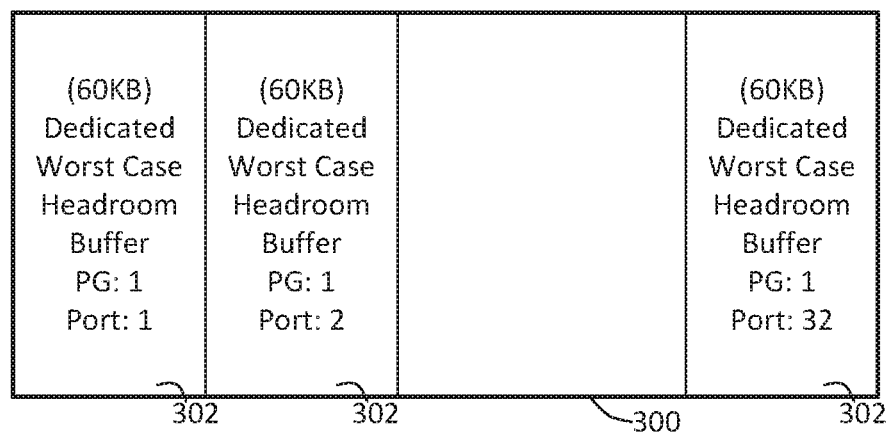
FIG. 3A illustrates static and worst case headroom buffer allocation.

FIG. 3A illustrates a headroom buffer pool 300 for a particular lossless priority group (PG 1) in which worst case headroom buffers 302, each 60 KB in size, are statically allocated to each port of a shared-memory network switch. Once allocated, the 60 KB headroom buffers are dedicated to the corresponding ports, regardless of utilization patterns across the set of ports. In total, the headroom buffer 300 consumes 32×60 KB or 1.92 MB, which may represent 50% or more of the switch's total memory and thereby prevent the switch from supporting any other lossless priority group.

Figure 3B:
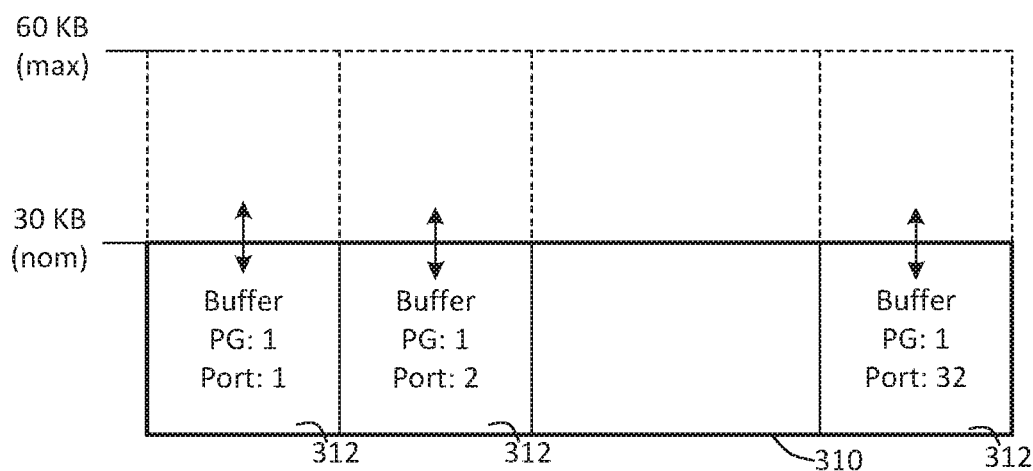
FIG. 3B illustrates an allocation for a shared headroom buffer pool in accordance with disclosed subject matter.

FIG. 3B illustrates a shared headroom buffer pool 310 half the size of the headroom buffer pool 300 in FIG. 3A. Instead of allocating each port a static and dedicated worst case headroom buffer, each port may utilize a headroom buffer 312 as needed, subject to a port maximum determined in accordance with the applicable worst case headroom values for each port-priority tuple. FIG. 3B particularly illustrates a shared headroom buffer threshold, which is equal to the worst cast headroom buffer 60 KB in the illustrated example. Thus, each port is provided with the ability to use its headroom buffer 312, subject only to the maximum or worst case headroom buffer for that port and availability within the shared headroom pool.

Any one or more processes or methods described above, including processes and methods associated with the FIG. 2 flow diagram, may be embodied as a computer readable storage medium or, more simply, a computer readable medium including processor-executable program instructions, also referred to as program code or software, that, when executed by the processor, cause the processor to perform or otherwise result in the performance of the applicable operations.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicate the presence of stated features, operations, elements, and/or components, but does not preclude the presence or addition of one or more other features, operations, elements, components, and/or groups thereof.

What is claimed is:

1. A switching method for a shared-memory switch comprising a plurality of ports supporting a plurality of priority levels, the method comprising:
   for each port-priority tuple (PPT) associated with a priority group (PG), estimating a worst case headroom (Hw) for a connection to a peer, wherein the shared-memory switch supports a pause command to suspend traffic via the connection and wherein each worst cast headroom is indicative of a headroom buffer required to buffer PPT traffic received from the peer via the connection;
   allocating a shared headroom buffer pool (Ps) shared by all PPTs in the priority group, wherein Ps is less than a worst case headroom buffer pool (Pw), and Pw is equal to the sum of each Hw corresponding to a PPT within the priority group; and
   subject to a PPT maximum, permitting any particular PPT in the priority group to consume Ps as needed for traffic received after sending a pause command.

2. The method of claim 1, wherein the PPT maximum for a particular PPT comprises the worst case headroom, Hw, for the particular PPT.

3. The method of claim 1, further comprising:
   monitoring utilization of Ps; and
   adjusting Ps in accordance with the utilization.

4. The method of claim 3, wherein adjusting Ps comprises:
   responsive to detecting the utilization of Ps exceeding a high utilization threshold, increasing Ps, subject to a maximum shared headroom buffer pool (Pmax); and
   responsive to detecting the utilization less than a low utilization threshold, decreasing Ps, subject to a minimum shared headroom buffer pool (Pmin);.

5. The method of claim 4, wherein increasing Ps comprises:
   determining a headroom increase corresponding to the product of Ps and an increase factor; and
   subject to Pmax, increasing Ps by the headroom increase.

6. The method of claim 5, wherein decreasing Ps comprises:
   determining an un-utilized portion of Ps;
   determining a shared headroom buffer pool reduction comprising a product of the un-utilized portion and a reduction factor; and
   subject to Pmin, releasing a portion of Ps equal to shared headroom buffer pool reduction.

7. The method of claim 6, wherein the low utilization threshold is 0.8, the reduction factor is 0.5, the high utilization threshold is 0.9, and the increase factor is 1.1.

8. The method of claim 4, wherein Pmax is equal to Pw and wherein Pmin is equal to N maximum transmission units (MTUs) where N is the number of PPTs associated with the PG.

9. The method of claim 4, wherein the shared memory switching includes at least one configuration register indicative of Ps and wherein adjusting Ps includes modifying a value of the at least one configuration register without halting packet traffic.

10. An information handling system comprising:
an embedded controller;
a plurality of ports;
a shared-memory switch;
a switching fabric, controlled by the embedded controller, interconnecting the plurality of ports; and
a computer readable medium including instructions, executable by the embedded controller, wherein the instructions, when executed by the embedded controller, cause the embedded controller to perform shared pool operations comprising:
for each port-priority tuple (PPT) associated with a priority group (PG), estimating a worst case headroom (Hw) for a connection to a peer, wherein the shared-memory switch supports a pause command to suspend traffic via the connection and wherein each worst cast headroom is indicative of a headroom buffer required to buffer post-pause traffic received from the peer via the connection;
allocating a shared headroom buffer pool (Ps) shared by all PPTs in the priority group, wherein Ps is less than a worst case headroom buffer pool (Pw), and Pw is equal to the sum of each Hw associated with a PPT of the priority group; and
permitting any particular PPT in the priority group to consume Ps as needed for post-pause traffic, subject to a PPT maximum equal to the worst case headroom Hw for the particular PPT.

11. The information handling system of claim 10, wherein Ps is less than Pw/M, wherein M is greater than or equal to 2.

12. The information handling system of claim 10, further comprising:
monitoring utilization of Ps; and
adjusting Ps in accordance with the utilization.

13. The information handling system of claim 12, wherein adjusting Ps comprises:
responsive to detecting the utilization exceeding a high utilization threshold, increasing Ps, subject to a maximum shared headroom buffer pool threshold (Pmax); and
responsive to detecting the utilization less than a low utilization threshold, decreasing Ps.

14. The information handling system of claim 13, wherein decreasing Ps comprises:
determining an un-utilized portion of Ps;
determining a pool reduction comprising a product of the un-utilized portion and a reduction factor; and
subject to Pmin, releasing a portion of Ps equal to the pool reduction.

15. The information handling system of claim 14, wherein increasing Ps comprises:
determining a headroom increase comprising a product of Ps and an increase factor; and
subject to Pmax, increasing Ps by the headroom increase.

16. The information handling system of claim 14, wherein releasing a portion of Ps comprises one of:
releasing the portion of Ps for burst traffic; and
increasing a shared headroom buffer pool of a different priority group; and
increasing a non-headroom buffer pool.

17. The information handling system of claim 13, wherein the shared pool operations further comprise performing the shared pool operations of claim 13 for each of a plurality of priority groups to allocate a plurality of shared headroom buffer pools, one corresponding to each priority group.

18. The information handling system of claim 13, wherein the priority group comprises a lossless priority group comprising a plurality of lossless levels.

19. A non-transitory computer readable medium, including instructions executable by a processor, wherein the instructions, when executed, cause the processor to perform operations, comprising:
for each port-priority tuple (PPT) associated with a priority group (PG), estimating a worst case headroom (Hw) for a connection to a peer, wherein the shared-memory switch supports a pause command to suspend traffic via the connection and wherein each worst cast headroom is indicative of a headroom buffer required to buffer post-pause traffic received from the peer via the connection;
allocating a shared headroom buffer pool (Ps) shared by all PPTs in the priority group, wherein Ps is less than a worst case headroom buffer pool (Pw), and Pw is equal to the sum of each Hw associated with a PPT of the priority group; and
permitting any particular PPT in the priority group to consume Ps as needed for post-pause traffic, subject to a PPT maximum.

20. The non-transitory computer readable medium of claim 19, wherein the operations include:
monitoring utilization of Ps;
responsive to detecting the utilization exceeding a high utilization threshold, increasing Ps, subject to a maximum shared headroom buffer pool threshold (Pmax); and
responsive to detecting the utilization less than a low utilization threshold, decreasing Ps, subject to a minimum shared headroom buffer pool threshold (Pmin); and
wherein Ps is less than Pw/M, M is greater than or equal to 2, Hmax is equal to Hw, and Pmax is equal to Pw.

* * * * *

UNITED STATES PATENT AND TRADEMARK OFFICE
CERTIFICATE OF CORRECTION

PATENT NO. : 10,038,652 B2
APPLICATION NO. : 15/251935
DATED : July 31, 2018
INVENTOR(S) : Ghanwani et al.

It is certified that error appears in the above-identified patent and that said Letters Patent is hereby corrected as shown below:

In the Claims

Column 10, Line 19, Claim 1, should read as follows:
1. A switching method for a shared-memory switch comprising a plurality of ports supporting a plurality of priority levels, the method comprising:
 for each port-priority tuple (PPT) associated with a priority group (PG), estimating a worst case headroom (Hw) for a connection to a peer, wherein the shared-memory switch supports a pause command to suspend traffic via the connection and wherein each worst case headroom is indicative of a headroom buffer required to buffer PPT traffic received from the peer via the connection;
 allocating a shared headroom buffer pool (Ps) shared by all PPTs in the priority group, wherein Ps is less than a worst case headroom buffer pool (Pw), and Pw is equal to the sum of each Hw corresponding to a PPT within the priority group; and
 subject to a PPT maximum, permitting any particular PPT in the priority group to consume Ps as needed for traffic received after sending a pause command.

Column 10, Line 44, Claim 4, should read as follows:
4. The method of claim 3, wherein adjusting Ps comprises:
 responsive to detecting the utilization of Ps exceeding a high utilization threshold, increasing Ps, subject to a maximum shared headroom buffer pool (Pmax); and
 responsive to detecting the utilization less than a low utilization threshold, decreasing Ps, subject to a minimum shared headroom buffer pool (Pmin).

Column 11, Line 10, Claim 10, should read as follows:
10. An information handling system comprising:
 an embedded controller;
 a plurality of ports;
 a shared-memory switch;
 a switching fabric, controlled by the embedded controller, interconnecting the plurality of ports; and Signed and Sealed this
Thirteenth Day of November, 2018

Andrei Iancu
*Director of the United States Patent and Trademark Office*

CERTIFICATE OF CORRECTION (continued)
U.S. Pat. No. 10,038,652 B2 a computer readable medium including instructions, executable by the embedded controller, wherein the instructions, when executed by the embedded controller, cause the embedded controller to perform shared pool operations comprising:

for each port-priority tuple (PPT) associated with a priority group (PG), estimating a worst case headroom (Hw) for a connection to a peer, wherein the shared-memory switch supports a pause command to suspend traffic via the connection and wherein each worst case headroom is indicative of a headroom buffer required to buffer post-pause traffic received from the peer via the connection;

allocating a shared headroom buffer pool (Ps) shared by all PPTs in the priority group, wherein Ps is less than a worst case headroom buffer pool (Pw), and Pw is equal to the sum of each Hw associated with a PPT of the priority group; and permitting any particular PPT in the priority group to consume Ps as needed for post-pause traffic, subject to a PPT maximum equal to the worst case headroom Hw for the particular PPT.

Column 12, Line 23, Claim 19, should read as follows:
19. A non-transitory computer readable medium, including instructions executable by a processor, wherein the instructions, when executed, cause the processor to perform operations, comprising:

for each port-priority tuple (PPT) associated with a priority group (PG), estimating a worst case headroom (Hw) for a connection to a peer, wherein a shared-memory switch supports a pause command to suspend traffic via the connection and wherein each worst case headroom is indicative of a headroom buffer required to buffer post-pause traffic received from the peer via the connection;

allocating a shared headroom buffer pool (Ps) shared by all PPTs in the priority group, wherein Ps is less than a worst case headroom buffer pool (Pw), and Pw is equal to the sum of each Hw associated with a PPT of the priority group; and permitting any particular PPT in the priority group to consume Ps as needed for post-pause traffic, subject to a PPT maximum.